United States Patent [19]

Soltow et al.

[11] Patent Number: 4,715,571
[45] Date of Patent: Dec. 29, 1987

[54] DEVICE FOR SECURING A PLURALITY OF ELECTRICAL CONDUCTORS OR CABLES

[75] Inventors: Uwe Soltow, Hamburg; Hans-Peter Guthke, Steinkirchen; Hans-Georg Plate, Roseburg; Johann Lechner, Hamburg; Safa Kirma, Wedel, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 806,284

[22] Filed: Dec. 6, 1985

[30] Foreign Application Priority Data

Dec. 13, 1984 [DE] Fed. Rep. of Germany ....... 3445489

[51] Int. Cl.$^4$ .............................................. F16L 3/22
[52] U.S. Cl. .................................... 248/68.1; 248/69; 248/74.2; 24/129 R; 24/115 R; 24/339; 174/146
[58] Field of Search ........................ 248/68.1, 69, 74.2, 248/65, 62; 24/129 D, 129 R, 115, 336, 339, 545, 130; 174/146

[56] References Cited

U.S. PATENT DOCUMENTS

| | | | |
|---|---|---|---|
| 277,374 | 5/1883 | Strohm | 174/146 |
| 2,683,578 | 7/1954 | Rainey | 248/68.1 |
| 2,888,546 | 5/1959 | Kinney | 174/146 |
| 2,902,821 | 9/1959 | Kelly, Jr. | 248/68.1 X |
| 2,983,014 | 5/1961 | Greenwood | 174/146 |
| 3,136,515 | 6/1964 | Potruch | 174/146 X |
| 3,586,292 | 6/1971 | Buck | 174/146 |
| 3,739,077 | 6/1973 | Winkelman | 174/146 X |
| 3,743,762 | 7/1973 | Annas et al. | 174/146 |
| 3,954,238 | 5/1976 | Nivet | 248/68.1 |
| 4,195,807 | 4/1980 | Llaugé | 248/74.2 |
| 4,638,469 | 1/1987 | Bryant et al. | 174/146 |

FOREIGN PATENT DOCUMENTS

| | | | |
|---|---|---|---|
| 221681 | 11/1957 | Australia | 248/68.1 |
| 2736730 | 2/1979 | Fed. Rep. of Germany . | |
| 3226185 | 1/1984 | Fed. Rep. of Germany | 248/69 |
| 2280013 | 2/1976 | France | 248/68.1 |
| 1106953 | 8/1984 | U.S.S.R. | 248/68.1 |

*Primary Examiner*—Randolph A. Reese
*Assistant Examiner*—Anthony Knight
*Attorney, Agent, or Firm*—W. G. Fasse; D. H. Kane, Jr.

[57] ABSTRACT

A plurality of electrical conductors or cables are held in place by a circular member, such as a ring or disk, or by two ring or disk elements forming a pair, to form a conductor or cable bunch. For this purpose a plurality of recesses are provided in the circumferential zone of the ring or disk, for holding a conductor or cable in place in each recess. The recesses in the ring or disk are closed by a rim section. The ring or disk elements have recess forming fingers or pieces which can be rotated into preliminary and final positions with an increased clamping force in the final position. In all embodiments the cable or conductors are held in place by a proper biasing force. The costs for forming cable or conductor bunches and for their final installation have been substantially reduced.

7 Claims, 15 Drawing Figures

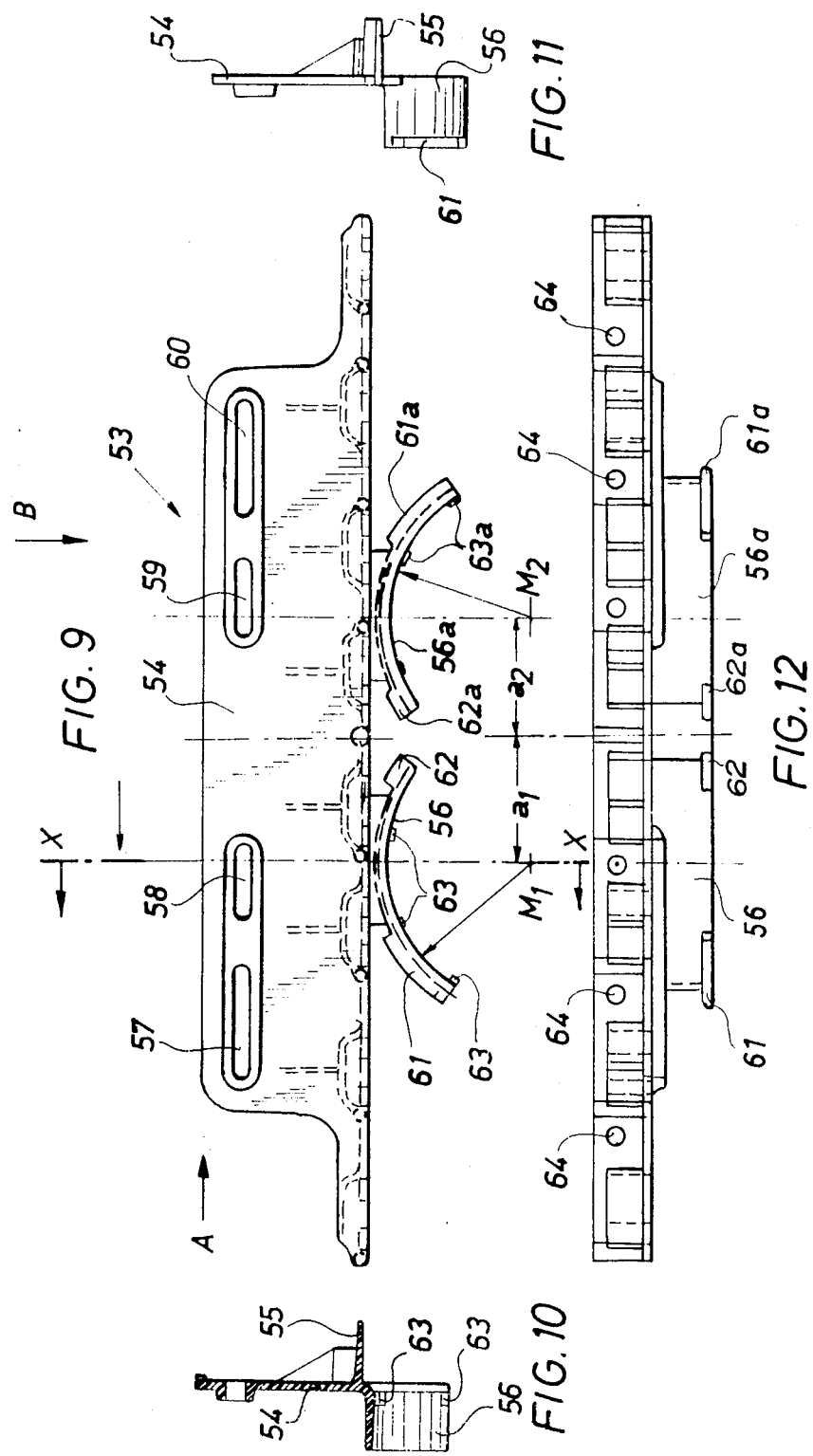

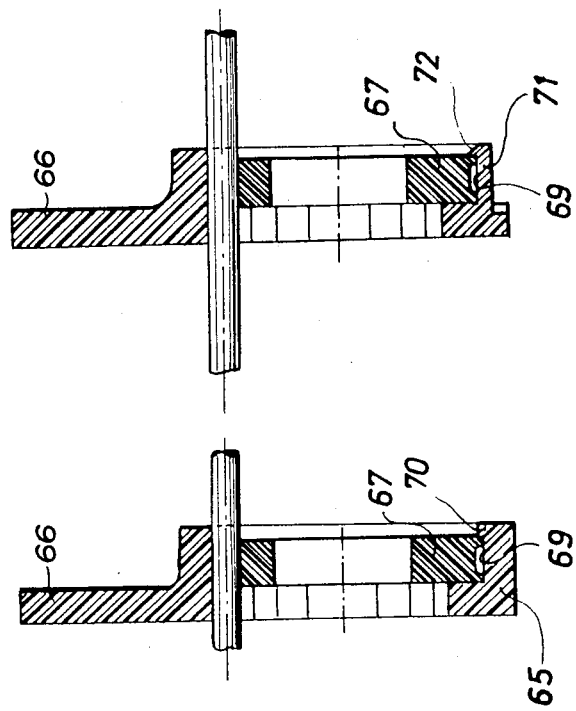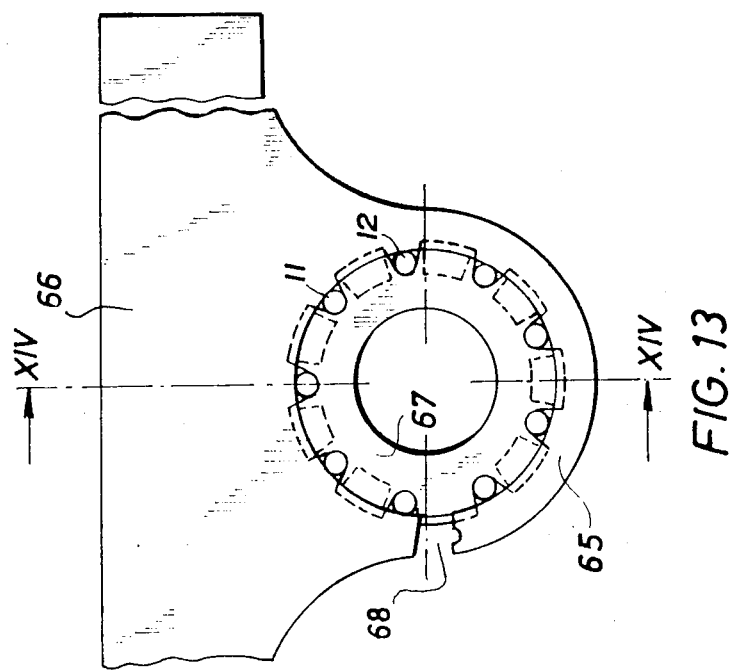

DEVICE FOR SECURING A PLURALITY OF ELECTRICAL CONDUCTORS OR CABLES

FIELD OF THE INVENTION

The invention relates to a device for securing a plurality of electrical conductors or cables, especially in an aircraft. Such device includes a disk made of synthetic material and having a plurality of recesses in its circumference for holding a conductor or cable. Each disk is so constructed that it can be secured to a carrier member with the aid of a mounting element which is adapted to the particular type of disk.

DESCRIPTION OF THE PRIOR ART

Cable mounting devices of this type are used in the air bus A300. These prior art cable mounting devices are made of a light metal by an injection molding method. The prior art devices comprise a ring oriented in a direction crosswise to the length of the cables or conductors and provided around its circumference with recesses in its edge. The conductors or cables are inserted into these recesses. The ring with the cables or conductors mounted therein is then secured with the aid of a mounting element to a carrier forming a structural component of the aircraft or the like. The conductors or cables arranged in bundles are protected in the zone of the edge recesses by a sleeve of synthetic material to avoid damages to the conductors. The conductors are held in the ring, or rather, in their respective recesses, by a clamping belt running around the ring.

German Patent Publication (DE-OS) No. 2,736,730 discloses such a conductor mounting device, whereby the electrical conductors are inserted into the edge recesses distributed around the circumference of a disk. This prior art conductor mounting device can be used for bundling a plurality of cables and/or conductors, whereby, however, primarily measuring cables of an engine testing apparatus are involved. At least one disk is used in which the edge recesses have a drop shaped configuration for buttoning the cable or conductors into the recesses. The disks are carried by a suspender, such as a chain, which in turn is carried by a cross beam or cantilever. The cables or conductors are held in the edge recesses by the elasticity of the cable insulation or by the elasticity of the disk if the disk is made of an elastic material.

These prior art cable mounting devices are not suitable for securing electrical energy conductors in an aircraft because the pinching of the cable insulation is undesirable since the cable insulation may be damaged, especially where the mounting disks are made of aluminum. The energy conductors or cables in an aircraft provide a power transmission from an auxiliary generator in the tail end of the aircraft to energy consumers primarily located in the front end of the aircraft. Relatively large currents are flowing in these conductors and such currents may have disturbing influences on other functions in the aircraft. Thus, it is desirable to keep any disturbing influences caused by these energy conductors as small as possible. This aim is achieved by distributing the supply conductors and the return conductors to several cables which are alternately secured around the circumference of the individual rings in the respective edge recesses.

Especially in connection with the mounting rings of light metal, the following features are undesirable, particularly in the manufacturing and assembly operations. The buttoning-in of the cables into the edge recesses of the rigid rings during the preliminary mounting is rather difficult, even though the cables are protected by the above mentioned sleeves of synthetic material. The difficulty stems from the manufacturing tolerances, especially of the cables and conductors. As a result, it is necessary to use substantial force in order to press a cable into its recess while other cables only sit in their recess without any sufficiently close fit so that it is easy to slip out of the respective recess. Thus, in order to make sure that the individual cables or conductors retain their position in the respective recess in which they have been inserted in the preliminary mounting, it is necessary to secure the cables in the ring by a clamping belt which runs around the ring until the final mounting. Further, the entire mounting system comprises a substantial number of components, especially due to the protection sleeves for the individual cables or conductors. The mounting of these components requires a correspondingly large number of work steps during the manufacture. Additionally, the total weight of the rings installed for the cable mounting in an aircraft is rather substantial.

OBJECTS OF THE INVENTION

In view of the foregoing it is the aim of the invention to achieve the following objects singly or in combination:

to construct a cable mounting device in such a way that all cables or conductors can be pressed into the mounting ring recesses approximately with the same tensioning or clamping effect even within a wide tolerance range for the cable or conductor diameters;

to make sure that a cable or conductor retains the position in which it was fixed during the preliminary mounting, until the final assembly in the aircraft, whereby separate retaining or clamping belts are avoided;

to substantially reduce the number of individual components required for such cable assembly and mounting;

to assure a lower weight of the entire cable mounting assembly; and to construct the securing or mounting device in such a manner that the size of the recesses which receive the cable or conductor may be adjusted so that even the clamping force is also adjusted for cables and conductors of different diameters.

SUMMARY OF THE INVENTION

According to the invention the mounting device for securing a plurality of electrical conductors or cables has elastic elements which form the recesses for retaining the initially assembled cables or conductors in place with such a biassing force that they will retain this defined position until the final mounting in the aircraft.

The advantages achieved according to the invention are primarily seen in that the manufacture or assembly mounting of the device has been substantially simplified by the reduction of the number of work steps and by obviating the protection sleeves and the clamping belts. Further, the material costs have been reduced, whereby the combination of a fewer number of work steps with reduced material costs has substantially reduced the overall manufacturing expense. The weight of the entire mounting system has been reduced and the individual cables and/or conductors are held in place by an elastic force which retains the conductor cable in place without any damage to the insulation.

BRIEF DESCRIPTION OF THE DRAWINGS

In order that the invention may be clearly understood, it will now be described, by way of example, with reference to the accompanying drawings, wherein:

FIG. 9 illustrates a carrier member including mounting elements for the cable securing device according to the invention;

FIG. 10 is a sectional view along seciton line X—X in FIG. 9;

FIG. 11 is a view in the direction of the arrow A in FIG. 9;

FIG. 12 is a view in the direction of the arrow B in FIG. 9;

FIG. 13 discloses a different carrier member with a mounting element for the present cable securing devices or disks;

FIG. 14 is a sectional view along section line XIV—XIV in FIG. 13; and

FIG. 15 is a view similar to that of FIG. 14, however showing a modified mounting element.

DETAILED DESCRIPTION OF PREFERRED EXAMPLE EMBODIMENTS AND OF THE BEST MODE OF THE INVENTION

Figure 1:
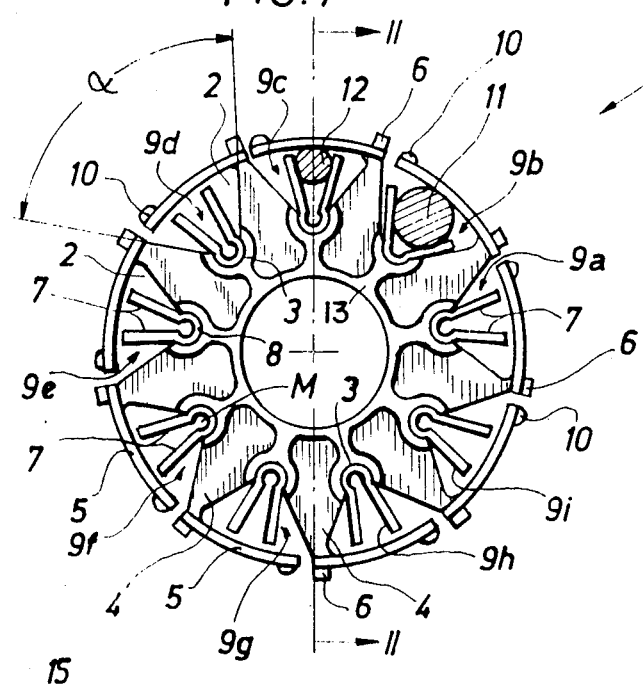
FIG. 1 is a plan view of one embodiment of a cable mounting device according to the invention with V-shaped recesses for holding a cable or conductor.

FIG. 1 shows a cable mounting single piece disk formed as a ring 1 having a central opening surrounded by a ring zone provided with a plurality, for example nine V-shaped recesses 2 uniformly distributed around the circumference of the ring 1. The recesses with the V-shape have a radially outwardly facing opening angle α having its center M in the center of a rounded bottom 3. The radius of the rounded bottom 3 will depend on the cable diameter for which the particular disk is intended. However, since the disk material surrounding the recess is elastic, a given rounding radius will accommodate a substantial range of cable diameters as shown at 11 and 12 in FIG. 1, and also substantial diameter tolerances.

Figure 4:
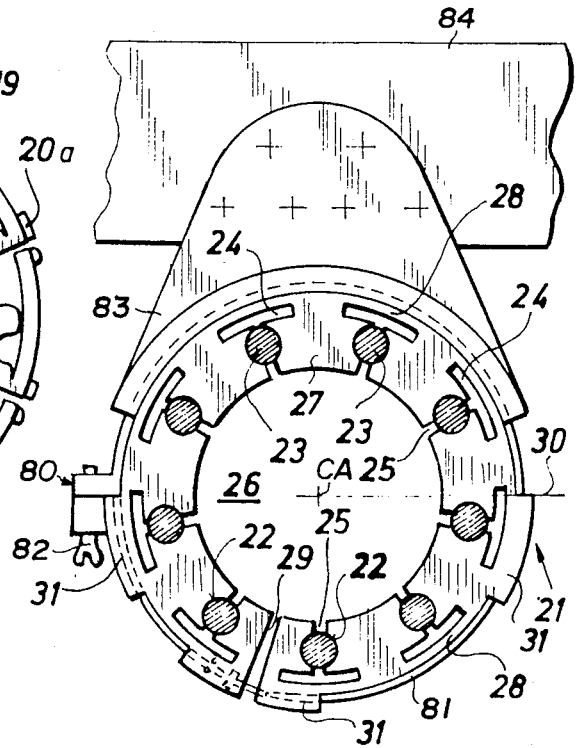
FIG. 4 shows an embodiment in which the mounting ring is slotted and provided with a plurality of recesses in which the conductors are inserted in a radially outward direction.

Each recess 2 is separated from its neighboring recess 2 by a radially extending spoke type member 4. Each spoke type member 4 carries a rim section 5 extending circumferentially and provided with a cam or grip 10. Each spoke type member further comprises two projections 6 extending radially outwardly for securing the ring 1 to a mounting element similar to that shown at 83 in FIG. 4. The projections 6 prevent a displacement of the ring in the axial direction relative to its mounting element which in turn is connected to a carrier member 84 also shown in FIG. 4. A spring clip 9a to 9i is inserted into each recess 2. Each spring clip has two legs 7 interconnected by a loop 8 received in the rounded bottom 3 of the respective recess with a press fit. A secure holding of the spring clips 9a to 9i is assured in this manner by respectively dimensioning the inner curvature of the curved bottom 3 and the outer curvature of the loop 8. The legs 7 of the springs 9a to 9i extend at a relatively acute angle relative to each other when there is no cable or conductor 11, 12 inserted into the spring clip. Please compare in this connection the spring clip 9a with the spring clips 9b and 9c. Each spring clip 9a to 9i forms with its respective rim section 5, which substantially closes the corresponding recess 2, a space in which the cable or conductor 11, 12 is inserted during the initial assembly and securely held therein.

The initial assembly is performed by lifting the respective rim section 5, whereby the respective junction to the spoke type elements 4 is an elastic hinge. The synthetic, plastic material of the disk is sufficiently elastic for this purpose. With the rim section 5 lifted, a cable or conductor 11, 12 may be pushed into the space between the legs 7 of the respective spring 9a to 9i. Upon release of the rim section 5, the latter has a sufficient leaf spring type of force which is radially effective for holding the cable or conductor in the desired position as shown with regard to the conductors or cable 11, 12 in FIG. 1. Due to the just described structure and the elastic cooperation of the springs 9a to 9i with the elastic rim section 5, it is assured that any manufacturing tolerances in cable diameters can be accommodated and that, even further, cables or conductors of different rated diameters may be held in place without any trouble. This is illustrated by the different diameters of the cables or conductors 11 and 12.

Figure 2:
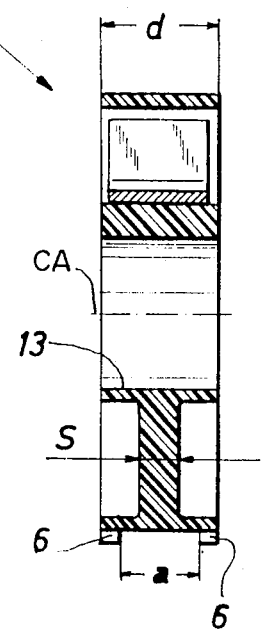
FIG. 2 is a sectional view along section line II—II in FIG. 1.

The sectional view of FIG. 2 illustrates the axial thickness d of the ring 1 and the axial spacing "a" of the projections 6. The disk cross-sectional shape is selected with due regard to weight considerations, manufacturing considerations, and strength considerations. Thus, the wall thickness S is reduced to reduce the weight accordingly. However, a strengthened internal portion 13 still assures the required structural rigidity.

Figure 3:
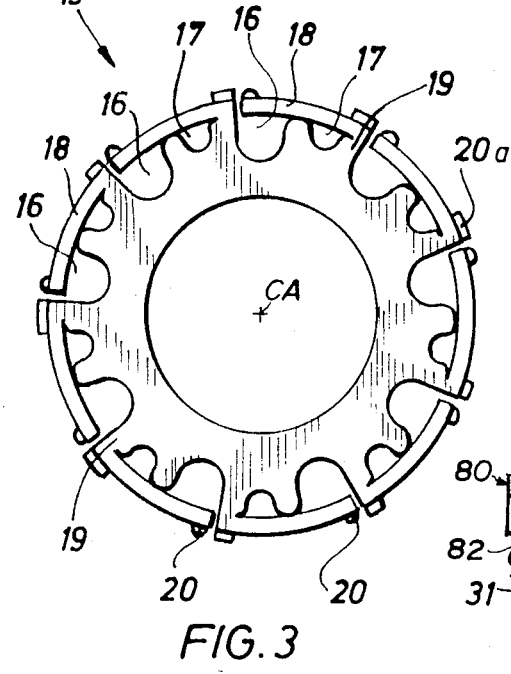
FIG. 3 is a view similar to that of FIG. 1, but showing a modified embodiment in which the recesses have a rounded bottom.

FIG. 3 shows a plan view of another embodiment similar to FIG. 1 whereby the view extends in the direction of the central axis CA as in FIG. 1. The ring 15 is again divided into nine sectors, whereby each sector is provided with radially outwardly facing recesses 16, 17. Recesses 16 take up cables of relatively larger diameter, whereas the recesses 17 take up conductors or cables with a relatively smaller diameter. A rim section 18 extends circumferentially to such an extent as to cover both recesses 16 and 17. One end of each rim section 18 is secured to its respective spoke type member 19, whereby the two projections 20a, corresponding to the projections 6 in FIGS. 1 and 2, are also located at the fixed end of the respective rim section 18 and serve for the same purpose as the projections 6 in FIG. 1, namely, to axially hold the respective ring 15 in a mounting element 83, for example. Each spoke type member 19 extends radially and participates in the formation of a small radius recess 17 and a large radius recess 16. Each free end of the rim sections 18 also carries a cam or projection 20 serving for the same purpose as the cam or projection 10 in FIG. 1, namely, for pulling the rim section radially outwardly by gripping the cam or projection 20 with a suitable tool for providing access to the recesses 16, 17. Here again, the rim sections 18 with their leaf spring type action will hold cables or conductors in the respective recesses within a wide range of tolerances and with different diameters. The spring action of the rim sections 18 is such, that during the initial assembly, the cables or conductors receive a sufficient secure seating in the respective recesses and so that a further tightening may be accomplished in the final assembly within a support structure.

FIG. 4 shows a ring 21 again with nine uniformly distributed recesses 22 reachable through gaps 25 extending radially inwardly as viewed from the central axis CA. The ring disk 21 has a central opening 26 reachable through a gap 29 and surrounded by slots 24 extending close to the circumference of the ring. Nine such slots 24 are provided, one for each recess 22. Each slot 24 communicates through the recess 22 and the gap 25 with the central opening 26 so that with the aid of the gap 29 the conductors or cables 23 may be snapped into the respective recesses 22. This snapping in place is possible because each slot 24 provides a relatively narrow circumferentially extending bridging section 28 which acting as a leaf spring type rim section permits bending the ring outwardly for moving the cables through the slot 29 and then into the respective recess through the slot 25. A plurality of projections 31 are located on the circumference or radially outwardly of the ring 21. These projections 31 serve the same purpose as the projections 6 for holding the ring against axial displacement. A hose clamp 80 with a strap 81 may be used for securing the mounting ring 21 to a mounting element 83, whereby the strap 81 is tightened by a wing headed screw 82. Such a hose clamp structure is conventional. The mounting element 83 in turn is secured to a carrier member 84 which extends across the central axis CA and which may carry a plurality of such mounting members 83 with rings 21 attached thereto.

The cables or conductors 23 are mounted in the recesses 22 by widening the slot 29 to such an extent that the individual conductors 23 will fit through the slot 29 and by widening also the individual slots 25. This is easily accomplished because the bridging sections 28 are sufficiently elastic so that they may be bent for this purpose. When all conductors 23 have been inserted into the recesses 22, the bridging sections 28 still exert a sufficiently elastic biasing force to return the ring 21 substantially into the position shown in FIG. 4 for holding the cables or conductors 23 in the desired position until the final assembly or mounting in the aircraft. At that time the hose clamp 81 is tightened with the screw 82 and thereby secured to the mounting element 83 carried by the carrier member 84.

Figure 5:
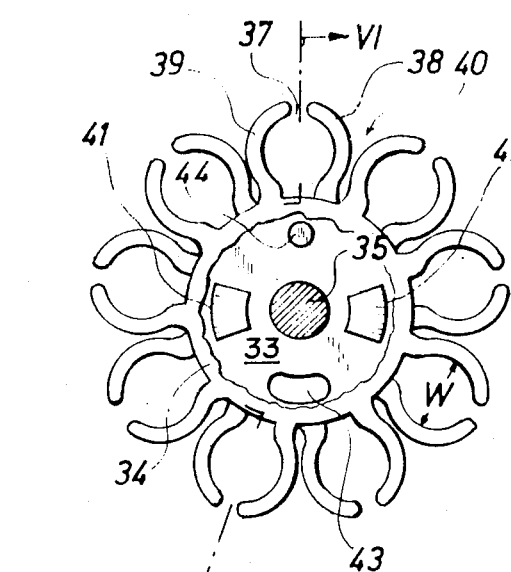
FIG. 5 shows a plan view of two disk elements forming together a cable mounting device, whereby the relative rotation of the two disk elements widens or narrows the cable receiving recess.
Figure 6:
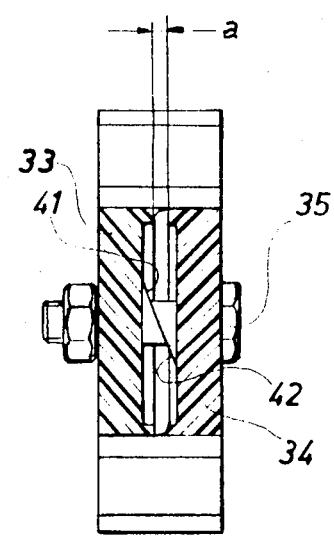
FIG. 6 is a sectional view along section line VI—VI in FIG. 5.

FIGS. 5 and 6 illustrate a further embodiment of a cable or conductor mounting device according to the invention comprising two disk sections 33 and 34. The disk section 34 facing the viewer is broken away at its center to show the components 41, 42, 43, and 44 to be explained below. The two disks are assembled into sandwich form as shown in FIG. 6. Both disks have an identical substantially mirror-symmetrical configuration with an axial, central bore for the screw 35. The disk section 33 has nine clamping fingers 38. The disk section 34 also has nine clamping fingers 39. The fingers 38 are curved counterclockwise and the fingers 39 are curved clockwise as seen by the viewer of FIG. 5. The fingers of one disk section and the oppositely curved fingers of the other disk section together form cable or conductor receiving recesses 37, the width W of which is adjustable as will be described below. A rear free space 40 is provided between two fingers of adjacent recess forming pairs. This free space 40 permits the elastic deformation of the individual fingers 38, 39 to space them apart for the insertion of a cable or conductor into the recess 37 having the width or spacing W.

As seen in FIG. 5, the disk 33 has two slanted screw type surfaces 41 and 42, as well as an elongated curved hole 43 and a pin 44 facing the viewer. Similarly, the disk section 34 has the same components 41, 42, 43, and 44, whereby the pin 44 of one disk reaches into the elongated hole 43 of the other disk and vice versa. Prior to the complete assembly, a spacing "a" is maintained between the two disk sections 33 and 34, whereby the screw surfaces 41 and 42 of one disk section contact the respective screw surfaces 42 and 41 of the other disk section as shown in FIG. 6. In this situation, the spacing W between two fingers 38 and 39 forming the recess 37 provides the clearance as shown in FIG. 5. In this condition, the disk section 34 is rotated relative to the disk section 33 in a clockwise direction to such an extent that the pin 44 rests in the left-hand end of the elongated hole 43. The screw surfaces 41, 42 form a type of a right-handed threading so that upon tightening of the screw 35 the disk section 34 rotates clockwise relative to the disk section 33, whereby the clearance W of the recesses 37 is reduced to the extent necessary for properly holding a conductor cable inserted into the recess 37.

During the preliminary assembly, the cable or conductors are inserted into the recesses 37 against the spring force of the fingers 38, 39, whereby the cables or conductors are held in position due to the elastic deformation of the fingers 38, 39 until the final mounting of the device with the cables inserted therein, in an aircraft. At the final mounting, the screw 37 is properly tightened to tightly hold the cables or conductors in place.

The embodiment illustrated in FIGS. 5 and 6 could be modified by replacing the screw type thread surfaces 41, 42 by a leg or clip-type spring having such a reset torque moment that the spring causes a rotation of the two disk sections 33 and 34 relative to each other. This rotation of the disk sections relative to each other is limited by a removable stop member in such a manner that the fingers 38, 39 initially are spaced with the clearance W as shown in FIG. 5. In this condition the preliminary assembly of the cables or conductors can easily be made while using the elasticity of the fingers 38 and 39 for inserting the cables or conductors into the recesses 37. At the final assembly in an aircraft, the just mentioned stop is removed, whereby the torque moment of the leg spring moves the two fingers 38 and 39 toward each other for the final clamping of the cable or conductor.

Figure 7:
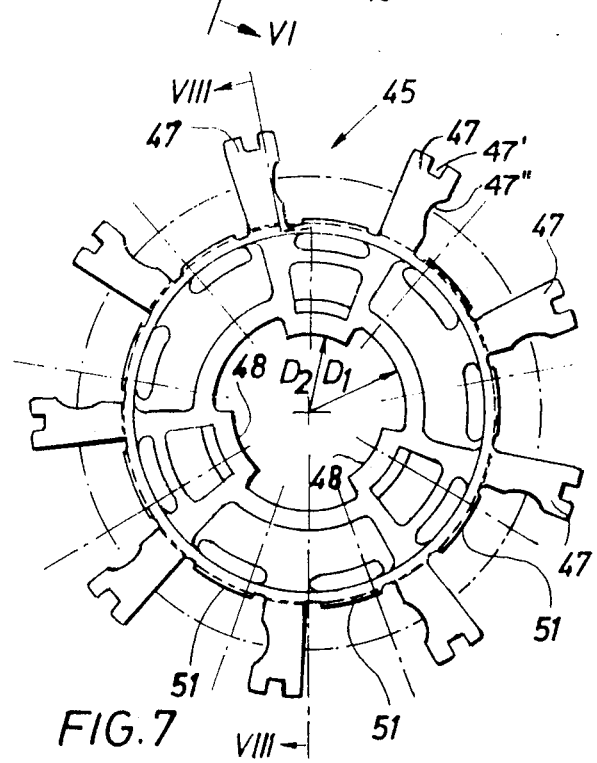
FIG. 7 shows a plan view of one disk element which forms, together with a substantially mirror-symmetrical second disk element, a cable mounting device, wherein again the cable or conductor receiving recess can be adjusted in its width by rotating the two disk elements relative to each other.
Figure 8:
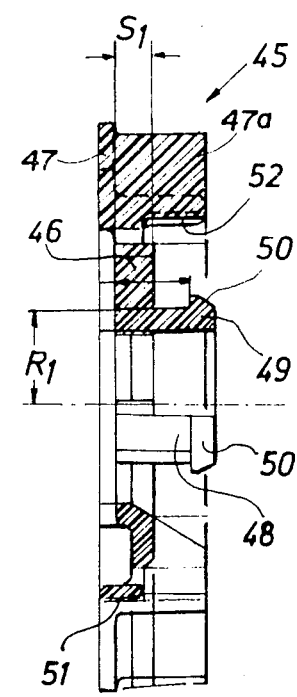
FIG. 8 is a sectional view along section line VIII—VIII in FIG. 7.

FIGS. 7 and 8 illustrate an embodiment similar to that of FIGS. 5 and 6, namely comprising two disk sections 45, only one is shown in FIGS. 7 and 8 because the configuration of these disk sections 45 is identical to each other. Each disk section 45 comprises a substantially ring shaped body 46 having a wall thickness S1 as shown in FIG. 8. Each ring body 46 carries radially extending clamping pieces 47. Each clamping piece has a notch 47' in its radially outer end and a cut-out 47" facing substantially circumferentially for cooperation with a respective cut-out of the corresponding clamping piece of the other disk section 45. Each body is provided with a central hole having the configuration best seen in FIG. 7 with large diameter portions D1 and small diameter portions D2. Projections 48 are formed along the small diameter portions D2. The projections 48 reach radially inwardly as shown in FIG. 7 and extend axially as shown in FIG. 8. The axially outer free end of each projection 48 is formed as a claw 49 having a conical surface 50 as best seen in FIG. 8.

The radially outer surface of the body 46 between the clamping pieces 47 is provided with teeth segments carrying relatively fine teeth 51. Each clamping piece 47 comprises a portion 47a extending axially outside of the body 46. The portion 47a has a radially inwardly facing surface provided with inner teeth 52 having the same pitch and diameter so that they can cooperate with the outer teeth 51 of the respective other disk section 45. A cable mounting device can be easily assembled without any tools and additional connecting elements by pushing two disk sections 45 axially toward each other with the claws 49 facing toward the respective other disk section so that the claws 49 of one disk section fit through the large diameter D1 portions of the respective other opening and vice versa. Simultaneously, the teeth 52 of one disk section 45 mesh with the teeth 51 of the other disk section and vice versa. Due to the conical surfaces 50 the claws 49 yield elastically radially inwardly during the axial pushing of the two disk sections toward each other, whereby they snap into a clamping position engaging the respective counter portion of the other disk section, whereby the cable or conductor mounting device is completed. Thus, one clamping piece of one disk section forms a pair with a clamping piece of the other disk section, whereby again the spacing between two clamping pieces 47 forming a pair may be changed by rotating the two disk sections relative to each other. The intermeshing gear teeth 51 and 52 act as a stop or catch for limiting the rotation of the disk sections 45 relative to each other. The arrangement is such that three neighboring teeth segments of the teeth 52 are displaced relative to the teeth 51 by one third of the tooth pitch, whereby the catch or stop may be positioned in steps which are substantially as small as desired.

In the preliminary assembly or mounting the spacing from one clamping piece 47 to the other is adjusted so that the cables or conductors can be pushed into the respective recess by using the elasticity of the clamping pieces 47 while radially pushing the cable or conductor into the recess. In the final assembly inside the aircraft the permanent clamping of the conductors is accomplished by further rotating the two disk sections 45 relative to each other, whereby the arrangement is such that the mounting elements which hold the cable securing device make sure that the two disk sections 45 cannot rotate back in a releasing direction even under the influence of vibrations.

FIGS. 9 to 12 show a carrier member 53 carrying a plurality of mounting elements 56, 56a, for mounting the cable or conductor securing devices described above. The carrier member 53 is made of thermoplastic synthetic material and comprises a vertical wall member 54 as well as a horizontal wall section 55 as shown in FIGS. 10 and 11. The vertical wall 54 and the horizontal wall section 55 form a type of angular section. The two mounting elements 56 are formed as integral components of the carrier member 53, for example, by injection molding. The wall 54 comprises a plurality of horizontally extending longitudinal holes 57, 58, 59, and 60 for securing the carrier member with its mounting elements to a structural component of the aircraft. The outer surfaces of the mounting elements 56, 56a are provided with two projections 61, 62 and 61a, 62a located adjacent to the free edge of the respective mounting element. These projections 61, 62 facilitate the mounting of a cable or conductor securing device to the carrier member. The inwardly facing surface of the mounting elements is provided with radially inwardly directed cams 63 which are spaced from each other circumferentially by a uniform angular spacing or division. The purpose of these cams 63 will be described below.

The installation of an electrical power cable, for example in an aircraft body, will now be described. A plurality of the carrier members 53 shown in FIGS. 9 to 12, are secured to the aircraft body, for example, along the body ribs above the so-called cassette ceiling. Due to the elongated holes 57 to 60 it is possible to secure the carrier members to any suitable structural components of the aircraft. When the carrier members 53 are mounted along the path for an energy conductor or cable, the rings or securing devices with the cables inserted therein, are then mounted in one of the mounting elements 56 or 56a, thereby using the hose clamp or cable binder as shown at 80,81,82 in FIG. 4. The other mounting element 56a or 56 which is not used remains free, whereby it becomes possible to use one or the other mounting element 56 or 56a regardless where the carrier member 53 is located on the front side or on the back side of a frame rib. Thus, the same carrier member 53 can be used for a left-hand or a right-hand mounting so to speak.

In order to keep any disturbances caused by magnetic fields emanating from the power cables, as small as possible, it is preferable to install the individual conductors or cables along a helical line from one securing disk to the other, whereby a twisted, snake wire effect is achieved. For this purpose, each mounting ring or disk is rotated by a predetermined angular degree relative to the preceding mounting disk. The cams 63, with their equal angular spacings, provide a guide for this purpose, whereby the cams 63 reach into respective grooves or depressions in the mounting disks or rings. Simultaneously, the engagement of the cams 63 in the respective ring or disks makes sure that a further rotation of the disks or rings relative to the mounting elements 56, 56a is prevented. Incidentally, the horizontal wall section 55 comprises holes 64 for the mounting of further conductors not shown.

FIGS. 13 and 14 show a mounting element 65 forming an integral part of a carrier member 66. The mounting element 65 forms a clamping ring or collar which substantially encircles a securing ring or disk 67, except for the opening 68. The ring or disk 67 may be of the type described above with reference to FIGS. 1 to 8. The clamping ring or collar 65 is relatively stiff and is provided on its inwardly facing surface with a groove 69 for holding the ring or disk 67. A radially inwardly projecting rim 70 secures the disk or ring 67 against axial displacement.

In order to install a ring or disk 67 already carrying the conductors 11, 12, in the clamping collar 65, the disk or ring 67 is placed laterally spaced from the collar 65 in a direction perpendicularly to the plane of FIG. 13, either in front of the sheet or behind the sheet. Thereafter, the individual conductors are moved through the opening 68. When all individual conductors are inside the collar 65, the opening 68 is slightly widened and the ring 67 is moved slightly axially into the plane of the drawing of FIG. 13 to snap into place behind the rim 70, whereupon the collar 65 is released again to properly grip the ring or disk 67, whereby the ring 67 is tightly enclosed and surrounded by the collar 65 due to the elastic bending force exerted by the collar 65 tending to narrow the opening 68. Thus, the position of the conductors 11, 12 in the recesses of the ring or disk 67 is permanently fixed. Here again, grooves or recesses may cooperate with cams for preventing a rotation of the ring or disk 67 relative to the collar 65.

It may be desirable to reinforce the collar 65 with a respectively curved steel spring not shown. Further, the opening 68 may actually be closable after the ring or disk 67 has been installed as described above. A hose clamp closure device would be suitable for this purpose as, for example, shown at 80, 81, 82 in FIG. 4.

FIG. 15 illustrates an embodiment quite similar to that of FIGS. 13 and 14 with the modification that the rim 70 has an axially and radially inwardly facing sloping surface 72 for facilitating the insertion of the ring or disk 67.

Although the invention has been described with reference to specific example embodiments, it will be appreciated, that it is intended to cover all modifications and equivalents within the scope of the appended claims. The use of the cable or conductor device of the invention is not limited to aircrafts. The device is suitable for the same purpose also in other environments, for example in ships, trains, and buildings.

What we claim is:

1. A device for securing a plurality of electrical conductor in a predetermined position to form a conductor bunch prior to final installation of the conductor bunch, comprising a single piece disk made of elastically yielding synthetic material and having a central opening and a ring zone around said central opening, a first plurality of recesses in said ring zone of said single piece disk for receiving said conductors, a further plurality of leaf spring type rim sections made of elastically yielding material, elastic hinge means securing said leaf spring type rim sections to said single piece disk, said leaf spring type rim sections extending around said ring zone for closing said first plurality of recesses and holding said conductors in said first plurality of recesses with an elastically yielding radially effective biasing force at least until final installation, said single piece disk including means for attaching said single piece disk to a mounting member.

2. The device of claim 1, wherein the first plurality of recesses are open radially outwardly prior to being closed by said leaf spring type rim sections.

3. The device of claim 1, wherein each of said leaf spring type rim sections covers two recesses.

4. The device for securing a plurality of electrical conductors in a predetermined position to form a conductor bunch prior to final installation of the conductor bunch, comprising a single piece disk made of elastically yielding synthetic material and having a central opening and a ring zone around said central opening, a first plurality of recesses in said ring zone of said single piece disk for receiving said conductors, a further plurality of leaf spring type rim sections made of elastically yielding material, elastic hinge means securing said leaf spring type rim sections to said single piece disk, said leaf spring type rim sections extending around said ring zone for closing said first plurality of recesses and holding said conductors in said first plurality of recesses with an elastically yielding radially inwardly effective biasing force at least until final installation, said single piece disk including means for attaching said single piece disk to a mounting member, wherein said leaf spring type rim sections have a fixed end, said elastic hinge means securing said fixed end to a point on the circumference of said ring zone of said single piece disk and a free end for lifting the respective rim section away from the disk to provide access to the respective recess or recesses of said first plurality of recesses.

5. The device of claim 1, wherein said recesses are open radially inwardly, and wherein each of said rim sections is spaced from its respective one of said recesses by a slot (24) extending in parallel to its rim section for enabling an elastic yielding of said rim sections.

6. The device of claim 1, wherein said single piece disk is a ring disk having radially extending spoke type members (19), each of said leaf spring type rim sections (18) having a fixed end secured to one of said spoke type members and a free end extending circumferentially around said ring disk for covering one or more recesses between neighboring spoke type members.

7. The device of claim 6, further comprising pairs of projections extending radially outwardly from said fixed end of said leaf spring type rim sections, said projections cooperating with said mounting member in axially fixing said device.

* * * * *